US009313364B2

(12) United States Patent
Tanaka (10) Patent No.: US 9,313,364 B2
(45) Date of Patent: Apr. 12, 2016

(54) IMAGE PROCESSING APPARATUS AND CONTROL METHOD FOR THE SAME

(71) Applicant: CANON KABUSHIKI KAISHA, Tokyo (JP)

(72) Inventor: Yasutomo Tanaka, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/736,313

(22) Filed: Jun. 11, 2015

(65) Prior Publication Data

US 2015/0373225 A1   Dec. 24, 2015

(30) Foreign Application Priority Data

Jun. 24, 2014   (JP) .................................. 2014-129708

(51) Int. Cl.
*G06F 3/12*      (2006.01)
*H04N 1/04*      (2006.01)
*H04N 1/32*      (2006.01)

(52) U.S. Cl.
CPC .................. *H04N 1/32609* (2013.01)

(58) Field of Classification Search
CPC ................... G06F 15/7867; G06F 2209/5011; G06F 8/52; G06F 9/30189; G06F 9/3828; G06F 9/3897; G06F 9/45504; G06F 9/5061; G06F 3/1229; G06F 3/1258; G06F 3/1212; G06F 3/1213; G06F 3/1221; G06F 3/1285
USPC ......... 358/474, 488, 1.15, 1.16, 1.13; 326/38, 326/37, 39, 46; 726/23, 1, 11, 13, 22; 709/239; 713/164, 166, 188, 193
See application file for complete search history.

(56) References Cited

U.S. PATENT DOCUMENTS

| 7,734,895 B1* | 6/2010 | Agarwal ................... G06F 8/52 712/13 |
| 8,299,816 B2* | 10/2012 | Yamada .............. G06F 15/7878 326/38 |
| 8,856,926 B2* | 10/2014 | Narayanaswamy H04L 63/1425 713/164 |
| 2005/0129348 A1* | 6/2005 | Iwasaki ............... G06F 17/5045 385/14 |
| 2011/0238954 A1* | 9/2011 | Naito .................. G06F 15/7867 712/220 |
| 2013/0194609 A1* | 8/2013 | Tanaka ............... G06K 15/1817 358/1.14 |
| 2014/0104634 A1* | 4/2014 | Tanaka ............... H04N 1/00904 358/1.13 |
| 2015/0043936 A1* | 2/2015 | Masuda ............. G03G 15/0131 399/74 |
| 2015/0079371 A1* | 3/2015 | Nakada .................. C04B 41/89 428/215 |
| 2015/0261478 A1* | 9/2015 | Obayashi .............. G06F 3/1212 358/1.15 |

FOREIGN PATENT DOCUMENTS

JP   2011186981 A   9/2011

* cited by examiner

*Primary Examiner* — Negussie Worku
(74) *Attorney, Agent, or Firm* — Rossi, Kimms & McDowell LLP (57) ABSTRACT

An image processing apparatus having a reconfigurable circuit in which a circuit configuration is partially performable, and a method for controlling the same are provided. Circuit configuration information for configuring the reconfigurable circuit is stored in advance, pieces of stored circuit configuration information that correspond to functions necessary for executing a job are specified, and the necessary functions are partially reconfigured in the reconfigurable circuit by configuring partial reconfiguration units of the reconfigurable circuit using the specified pieces of circuit configuration information. If the reconfiguring is successful, the job is executed using the reconfigurable circuit, whereas if the reconfiguring fails, reconfiguring is re-executed.

15 Claims, 7 Drawing Sheets

FIG. 7

IMAGE PROCESSING APPARATUS AND CONTROL METHOD FOR THE SAME

BACKGROUND OF THE INVENTION

1. Field of the Invention

The present invention relates to an image processing apparatus and a control method for the same.

2. Description of the Related Art

Reconfigurable circuits such as a PLD (Programmable Logic Device) and an FPGA (Field Programmable Gate Array) that have changeable logic circuitry are well-known. Generally, when a PLD or an FPGA starts up, circuit configuration information stored in a non-volatile memory such as a ROM is written to a configuration memory, which is an internal volatile memory, and thus the logic circuitry is switched. Also, the information in the configuration memory is deleted when the power supply is interrupted, and therefore when power is supplied, it is necessary to reconfigure the logic circuitry by again writing the circuit configuration information from the non-volatile memory to the configuration memory. The method of configuring the logic circuitry of a PLD or an FPGA only one time in this way is called static reconfiguring.

On the other hand, FPGAs and the like whose logic circuitry can be changed while the circuitry is operating have been developed, and the method of changing the logic circuitry during operation is called dynamic reconfiguring. Also, there are FPGAs in which it is possible to rewrite simply a specific region instead of the entire chip, and this type of rewriting is called partial reconfiguring. In particular, there is a method of partially reconfiguring one logic circuitry portion without stopping the operation of other logic circuitry that is operating, and this method is called dynamic partial reconfiguring.

With dynamic partial reconfiguring, rather than rewriting the entirety of the configuration memory during dynamic reconfiguring, only a portion of the configuration memory region is rewritten, thus making it possible to partially reconfigure the logic circuitry in the FPGA. Using this dynamic partial reconfiguring technique enables implementing multiple logic circuits in one region of the FPGA, thus making it possible to realize a logic circuitry in which hardware resources are time-division multiplexed. As a result, various functions corresponding to various applications can be flexibly realized with few hardware resources, while maintaining high hardware operation performance.

As one example of a technique employing this dynamic partial reconfiguring, Japanese Patent Laid-Open No. 2011-186981 discloses a technique in which, in pipeline processing, data processing is performed while switching functions by performing reconfiguring in a reconfigurable circuit in order beginning with the circuit at the head of the pipeline.

In image processing apparatuses such as MFPs (Multi Function Printers) of recent years, it has been possible to select multiple processes (a copy job, a print job, a send job, and the like) corresponding to a request from a user, and image processing corresponding to the processes is executed by hardware or software. If a reconfigurable circuit such as an FPGA is employed as hardware for image processing in this image processing apparatus, the circuit configuration of the FPGA can be dynamically and partially switched in order to realize each of the various functions described above. As a result, various image processing functions can be realized with few hardware resources. Note that in a configuration for performing partial reconfiguring, if the partial reconfiguring fails for any of various reasons, such as a device failure, electrical noise, or a writing timing problem, it is not possible to configure the circuit that is needed, and it is not possible to realize intended data processing.

In the case of a reconfigurable circuit that is partially reconfigured during use as described above, if the partial reconfiguring fails, the performance of the apparatus degrades. For example, if some sort of reason causes the failure of partial reconfiguring for a certain image processing function needed for a specific image processing function, it will not be possible to use that image processing function, processing will stop, and the performance of the image processing apparatus will degrade. For this reason, with a configuration in which a reconfigurable circuit is partially reconfigured during use, it is necessary to implement the configuration with consideration given to the possibility of the failure of the partial reconfiguring.

SUMMARY OF THE INVENTION

The present invention enables realization of a mechanism that, in an image processing apparatus having a reconfigurable circuit whose circuit configuration can be partially reconfigured, suppresses, as much as possible, degradation in the performance of the apparatus in the case of the failure of reconfiguring of the reconfigurable circuit.

One aspect of the present invention provides an image processing apparatus comprising: a reconfigurable circuit that includes a first portion and a second portion, in which a circuit configuration is partially performable; a storage unit that stores first circuit configuration information used for configuring, in the first portion, a first circuit which serves a predetermined function, and second circuit configuration information used for configuring, in the second portion, a second circuit which serves the predetermined function; a specification unit that specifies a portion of the reconfigurable circuit, in which a circuit which serves the predetermined function is to be configured; and a configuring unit that performs, if the first portion being specified by the specification unit, a circuit configuration on the first portion using the stored first circuit configuration information, and performs, if the second portion being specified by the specification unit, a circuit configuration on the second portion using the stored second circuit configuration information.

Another aspect of the present invention provides a control method that uses a reconfigurable circuit including a first portion and a second portion, in which a circuit configuration is partially performable, the method comprising: specifying a portion of the reconfigurable circuit in which a circuit serving a predetermined function is to be configured; performing control for, if the first portion being specified in the specifying, configuring, in the first portion, a circuit which serves the predetermined function using first circuit configuration information; and performing control for, if the second portion being specified in the specifying, configuring, in the second portion, a circuit which serves the predetermined function using second circuit configuration information.

Still another aspect of the present invention provides an image processing apparatus having a reconfigurable circuit in which a circuit configuration is partially performable, the image processing apparatus comprising: a storage unit that stores circuit configuration information for configuring the reconfigurable circuit; a specification unit that specifies a piece of circuit configuration information stored in the storage unit that corresponds to a function necessary for execution of a job; a reconfiguring unit that partially reconfigures the function in the reconfigurable circuit by configuring a partial reconfiguration unit of the reconfigurable circuit using the piece of circuit configuration information that was specified by the specification unit; and a control unit that performs control so as to execute the job using the reconfigurable circuit if reconfiguring by the reconfiguring unit is successful, and cause the reconfiguring unit to re-execute reconfiguring if reconfiguring by the reconfiguring unit fails.

Yet still another aspect of the present invention provides a control method for controlling an image processing apparatus having a reconfigurable circuit in which a circuit configuration is partially performable, the control method comprising: specifying a piece of circuit configuration information that is stored in a memory configured to store circuit configuration information for configuring the reconfigurable circuit, and that corresponds to a function necessary for execution of a job; partially reconfiguring the function in the reconfigurable circuit by configuring a partial reconfiguration unit of the reconfigurable circuit using the piece of circuit configuration information that was specified in the specifying step; and performing control so as to execute the job using the reconfigurable circuit if reconfiguring in the reconfiguring step is successful, and cause reconfiguring in the reconfiguring step to be re-executed if reconfiguring in the reconfiguring step fails.

Further features of the present invention will be apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
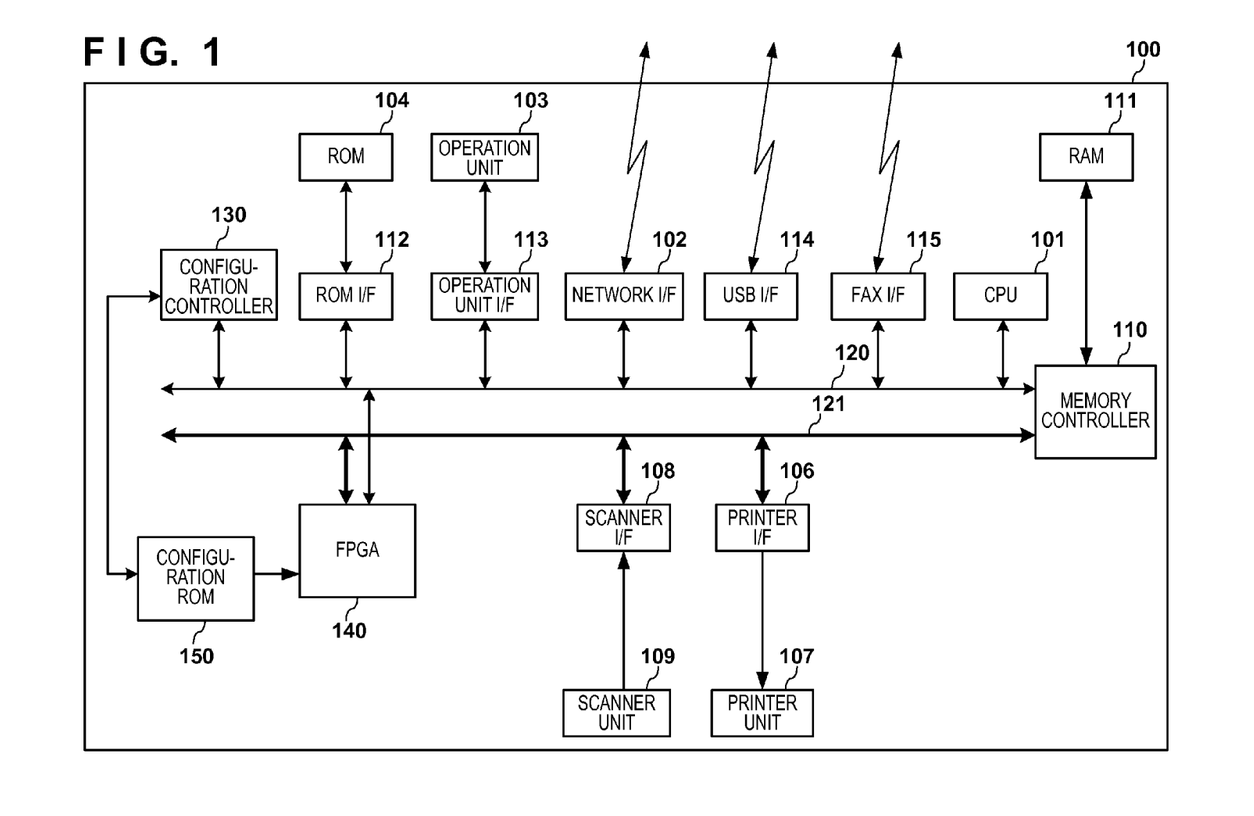
FIG. 1 is a block diagram for describing a configuration of an image processing apparatus according to an embodiment of the present invention.

FIG. 1 is a block diagram for describing the configuration of an image processing apparatus 100 according to an embodiment of the present invention.

The image processing apparatus 100 has an operation unit 103 that has keys, a touch panel, and the like operated by a user who uses the image processing apparatus 100; a scanner unit 109 that reads an image of an original by scanning the original; and a printer unit 107 that prints an image on a sheet based on image data. The scanner unit 109 has a CPU (not shown) that controls the scanner unit 109, an illumination lamp and a scanning mirror (neither of which are shown) for reading originals, and the like. The printer unit 106 has a CPU (not shown) that controls the printer unit 106, a photoreceptor drum and a fixing device (neither of which are shown) for performing image formation and fixing, and the like.

The image processing apparatus 100 also includes a CPU 101 that performs overall control of operations of the image processing apparatus 100, and the CPU 101 executes a control program for controlling units of the image processing apparatus 100. Also, a ROM 104 stores various data and the control program executed by the CPU 101. A RAM 111 provides a system work memory for operations performed by the CPU 101, and an image memory for temporarily storing image data. A memory controller 110 controls the writing of data to the RAM 111 and the reading out of data from the RAM 111. The memory controller 110 is connected to a system bus 120 and an image bus 121, and controls access to the RAM 111.

An FPGA (Field Programmable Gate Array) 140 is a reconfigurable circuit, and configures an image processing circuit and the like of the image processing apparatus 100. Although the reconfigurable circuit is described taking the example of an FPGA in the present embodiment, a reconfigurable circuit other than an FPGA may be used. A configuration controller 130 controls the circuit configuration of the FPGA, under control of the CPU 101. A configuration ROM 150 stores circuit configuration information (configuration data) for configuring the circuitry of the FPGA 140. The circuit configuration information of the FPGA 140 can be dynamically rewritten, and can also be partially rewritten. Specifically, while one circuit configured in one portion of a reconfiguration unit of the FPGA 140 is operating, it is possible to configure another circuit in another portion that does not overlap with the portion occupied by the one circuit.

A network I/F 102 performs communication (transmission and reception) with a general-purpose computer or the like (not shown) over a network. A printer I/F 106 connects the image bus 121 to the printer unit 107, and controls interfacing with the printer unit 107. A scanner I/F 108 outputs image data input from the scanner unit 109 to the image bus 121, and controls interfacing with the scanner unit 109. A USB I/F 114 performs communication (transmission and reception) with a general-purpose computer, a USB device, or the like (not shown) that is connected to the image processing apparatus 100 via a USB interface. A FAX I/F 115 is for connection to a public line network, and performs communication (transmission and reception) with an image processing apparatus or a facsimile apparatus (not shown). A ROM I/F 112 controls the reading out of data from the ROM 104, such as the reading out of a program that is to be executed by the CPU 101. An operation unit I/F 113 controls interfacing between the CPU 101 and the operation unit 103. Here, the FPGA 140, the scanner I/F 108, and the printer I/F 106 are connected to the image bus 121 for transferring image data targeted for processing. Also, the network I/F 102, the USB I/F 114, the FAX I/F 115, the operation unit I/F 113, the ROM I/F 112, the configuration controller 130, and the FPGA 140 are connected to the CPU 101 via the system bus 120. The CPU 101 sets parameters in the FPGA 140, the scanner I/F 108, and the printer I/F 106 via the system bus 120.

Next, a description will be given for the configuration related to partial reconfiguring in the image processing apparatus 100 of the present embodiment, with reference to FIG. 2.

Figure 2:
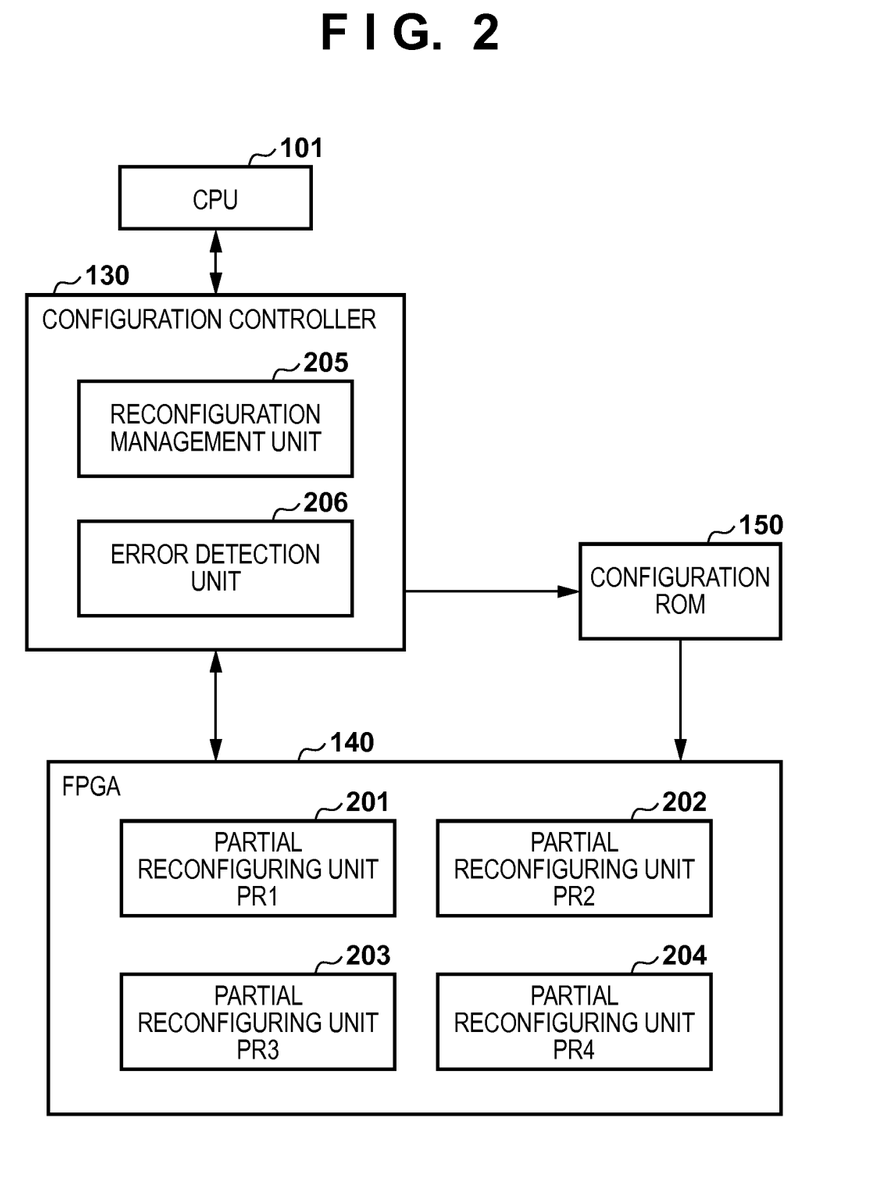
FIG. 2 is a block diagram for describing a configuration related in particular to partial reconfiguring of the image processing apparatus according to the embodiment.

FIG. 2 is a block diagram for describing the configuration related in particular to partial reconfiguring in the image processing apparatus 100 of the present embodiment. Portions in FIG. 2 that are illustrated in FIG. 1 are indicated by the same reference numbers in FIG. 2.

The FPGA 140 has four partial reconfiguration units (PR1 to PR4) 201 to 204 therein. These partial reconfiguration units can dynamically reconfigure their circuit configurations. Although the example in which circuits having image processing functions are configured in the partial reconfiguration units is described in the present embodiment, it goes without saying that circuits having functions other than image processing functions can be configured in the partial reconfiguration units.

The configuration controller 130 writes configuration data that is stored in the configuration ROM 150 to the partial reconfiguration unit that was instructed by the FPGA 140. The configuration controller 130 has a reconfiguration management unit 205 and an error detection unit 206. The reconfiguration management unit 205 manages each of the partial reconfiguration units 201 to 204. For example, the reconfiguration management unit 205 manages the free statuses of the partial reconfiguration units 201 to 204, such as whether these partial reconfiguration units are being used in current processing. Moreover, the reconfiguration management unit 205 determines whether or not the partial reconfiguration units can be rewritten. The reconfiguration management unit 205 rewrites configuration data in the partial reconfiguration units 201 to 204 based on instructions from the CPU 101 and determination results indicating whether or not the partial reconfiguration units can be rewritten.

The error detection unit 206 detects an error in the case where the partial reconfiguring of any of the partial reconfiguration units 201 to 204 did not end normally. For example, the error detection unit 206 monitors for an error signal that is output by the reconfigurable circuit (FPGA) when, during the rewriting of the partial reconfiguration unit 201, the rewriting of the configuration data fails for some sort of reason. The error detection unit 206 notifies the reconfiguration management unit 205 if this error signal is detected. The processing performed in the case where the error detection unit 206 detected an error will be described later with reference to FIGS. 4 to 7.

Next, a description will be given regarding a method for storing configuration data for configuring the partial reconfiguration units 201 to 204 of the FPGA 140 in the image processing apparatus 100 according to the present embodiment, with reference to FIG. 3.

Figure 3:
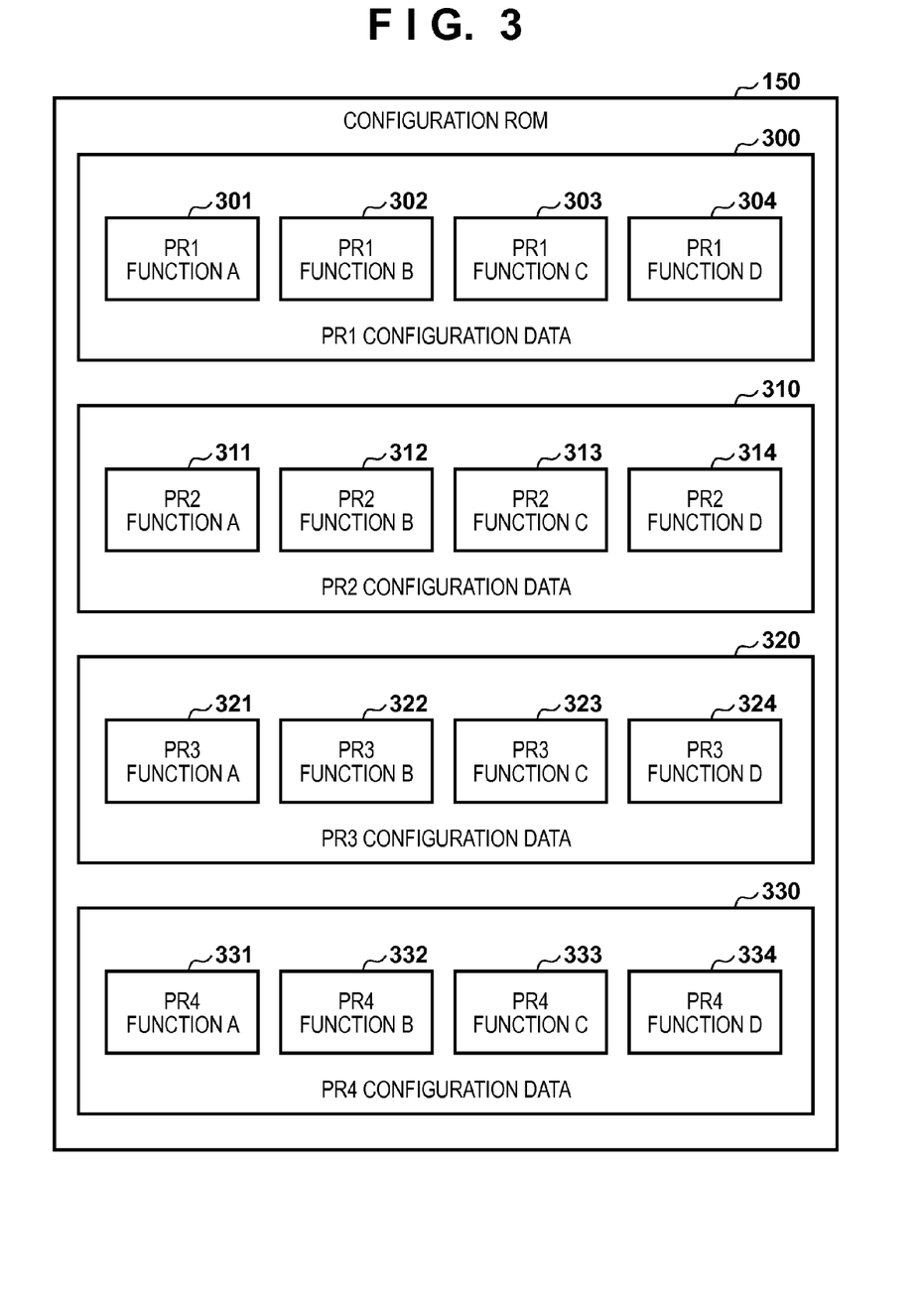
FIG. 3 is a diagram for describing a data configuration of configuration data stored in a configuration ROM according to the embodiment.

FIG. 3 is a diagram for describing a data configuration of configuration data stored in the configuration ROM 150 of the present embodiment.

Pieces of configuration data necessary for partial reconfiguring of the partial reconfiguration units 201 to 204 of the FPGA 140 is stored in the configuration ROM 150 in correspondence with the partial reconfiguration units. Configuration data 300 for the partial reconfiguration unit 201 (PR1) indicates configuration data for configuring logic circuitry in the partial reconfiguration unit 201. FIG. 3 shows the case where there are four functions A, B, C, and D that can be configured in the partial reconfiguration unit 201. Configuration data 301 is configuration data for configuring a circuit for the function A in the PR1. Similarly, configuration data 302 to 304 are configuration data for respectively configuring circuit configurations for the functions B, C, and D in the PR1.

Also, configuration data 310 indicates configuration data for configuring logic circuitry in the partial reconfiguration unit (PR2) 202. The configuration data 310 for the PR2 also stores configuration data for four functions A, B, C, and D, and configuration data 311 is configuration data for configuring a circuit for the function A in the PR2. Similarly, configuration data 312 to 314 are configuration data for respectively configuring circuit configurations for the functions B, C, and D in the PR2.

Also, configuration data 320 indicates configuration data for configuring logic circuitry in the partial reconfiguration unit (PR3) 203. The configuration data 320 for the PR3 also stores configuration data for four functions A, B, C, and D, and configuration data 321 is configuration data for configuring a circuit for the function A in the PR3. Similarly, configuration data 322 to 324 are configuration data for respectively configuring circuit configurations for the functions B, C, and D in the PR3.

Also, configuration data 330 indicates configuration data for configuring logic circuitry in the partial reconfiguration unit (PR4) 204. The configuration data 330 for the PR4 also stores configuration data for four functions A, B, C, and D, and configuration data 331 is configuration data for configuring a circuit for the function A in the PR4. Similarly, configuration data 332 to 334 are configuration data for respectively configuring circuit configurations for the functions B, C, and D in the PR4.

As described above, it is necessary to prepare configuration data for each of the partial reconfiguration units. For example, consider the case where the circuit configuration for the function A is configured in the partial reconfiguration unit (PR1) 201 and the partial reconfiguration unit (PR2) 202. In this case, even though the function is the same function A, it is necessary to prepare different configuration data depending on the partial reconfiguration unit, that is to say the function A configuration data 301 for the PR1 and the function A configuration data 311 for the PR2.

For this reason, if many pieces of configuration data are provided for each partial reconfiguration unit, each partial reconfiguration unit can be used for various functions, but there is an increase in the amount of data stored in the configuration ROM 150. On the other hand, if a limitation is placed on the reconfiguration units that are configured differently for each function, the number of functions that can be configured in each partial reconfiguration unit becomes limited, but it is possible to reduce the amount of configuration data, thus making it possible to reduce the capacity of the configuration ROM 150.

The present embodiment describes the case where the FPGA 140 has four partial reconfiguring regions, and the four functions A, B, C, and D are configured in each of the partial reconfiguring regions. Of course, the number of partial reconfiguring regions and the number of functions configured therein are limited to four merely in order to simplify the description, and there is no need for them to be limited to four.

Figure 4:
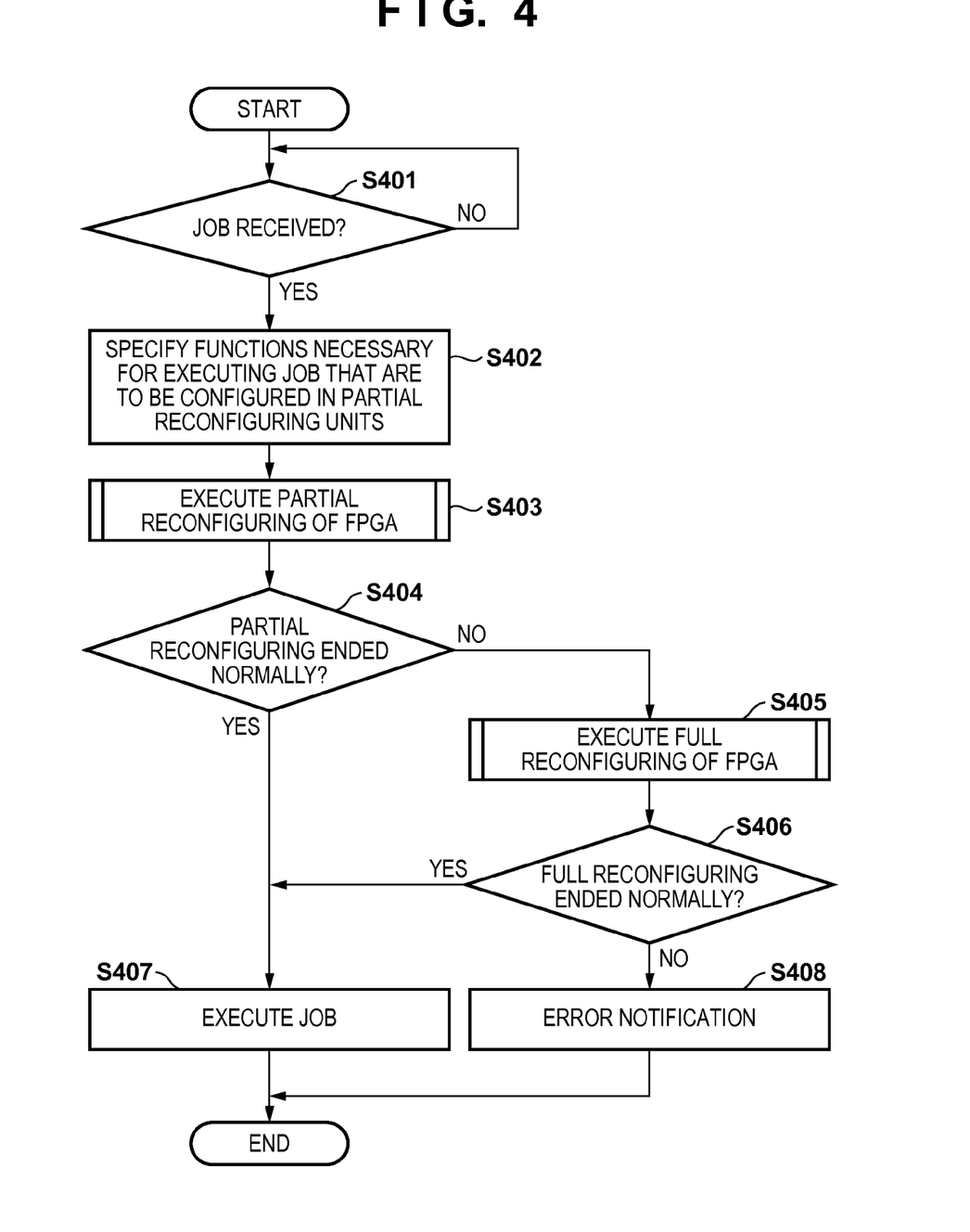
FIG. 4 is a flowchart for describing processing performed by the image processing apparatus according to the embodiment of the present invention.

FIG. 4 is a flowchart for describing processing performed by the image processing apparatus 100 according to this embodiment of the present invention. Note that the procedures in the flowchart of FIG. 4 are executed by the CPU 101 executing a control program stored in the ROM 104.

First, the CPU 101 receives a job in step S401, and then proceeds to step S402, in which the CPU 101 specifies functions that need to be configured in the FPGA 140 in order to execute the received job. For example, if the function A is needed in order to execute the received job, the function A is specified as a function needed for the execution of that job. Next, the procedure moves to step S403, in which the CPU 101 configures the functions specified in step S402 in partial reconfiguration units of the FPGA 140. In this step S403, under control of the CPU 101, the configuration controller 130 reads out configuration data necessary for configuring the specified functions from the configuration ROM 150, and writes the configuration data to partial reconfiguration units of the FPGA 140. Details of the partial reconfiguring execution processing in step S403 will be described later with reference to FIG. 5.

Next, the procedure moves to step S404, in which the CPU 101 determines whether or not the configuring of partial reconfiguration units of the FPGA 140 in step S403 was successful such that the functions specified in step S402 can be executed. Here, the CPU 101 determines whether or not the configuring of the partial reconfiguration units was successful based on a detection result that the reconfiguration management unit 205 of the configuration controller 130 acquired from the error detection unit 206. If the CPU 101 determined in step S404 that all of the functions necessary for job execution that were specified in step S402 have been configured in the partial reconfiguration units of the FPGA 140, the procedure moves to step S407. In step S407, the CPU 101 performs processing for the received job using the functions configured in the FPGA 140, and then ends this processing.

On the other hand, if it was determined in step S404 that the configuring of the partial reconfiguration units failed, the procedure moves to step S405. In step S405, the CPU 101 causes the configuration controller 130 to execute full reconfiguring of the FPGA 140 since the partial reconfiguring for functions necessary for job execution ended with an error. The flow of execution of full reconfiguring of the FPGA 140 that is executed in step S405 will be described later with reference to FIG. 7. When the processing of step S405 ends, the procedure moves to step S406, in which the CPU 101 determines whether full reconfiguring of the FPGA 140 ended normally. Here as well, the CPU 101 determines whether or not the full reconfiguring was successful based on a detection result that the reconfiguration management unit 205 of the configuration controller 130 acquired from the error detection unit 206. If the CPU 101 determined in step S406 that full reconfiguring of the FPGA 140 ended normally, the procedure moves to step S407, whereas if the full reconfiguring ended with an error, the procedure moves to step S408, in which an error notification is issued, and this processing is ended. This error notification displays the error on the display unit of the operation unit 103 in accordance with an instruction from the CPU 101, and prompts the user to reset the power supply, for example.

Accordingly, functions necessary for executing the received job are configured in the reconfigurable circuit (FPGA), and the job can be executed using the reconfigurable circuit in which the functions are configured.

Next, partial reconfiguring execution processing will be described in detail with reference to FIG. 5.

Figure 5:
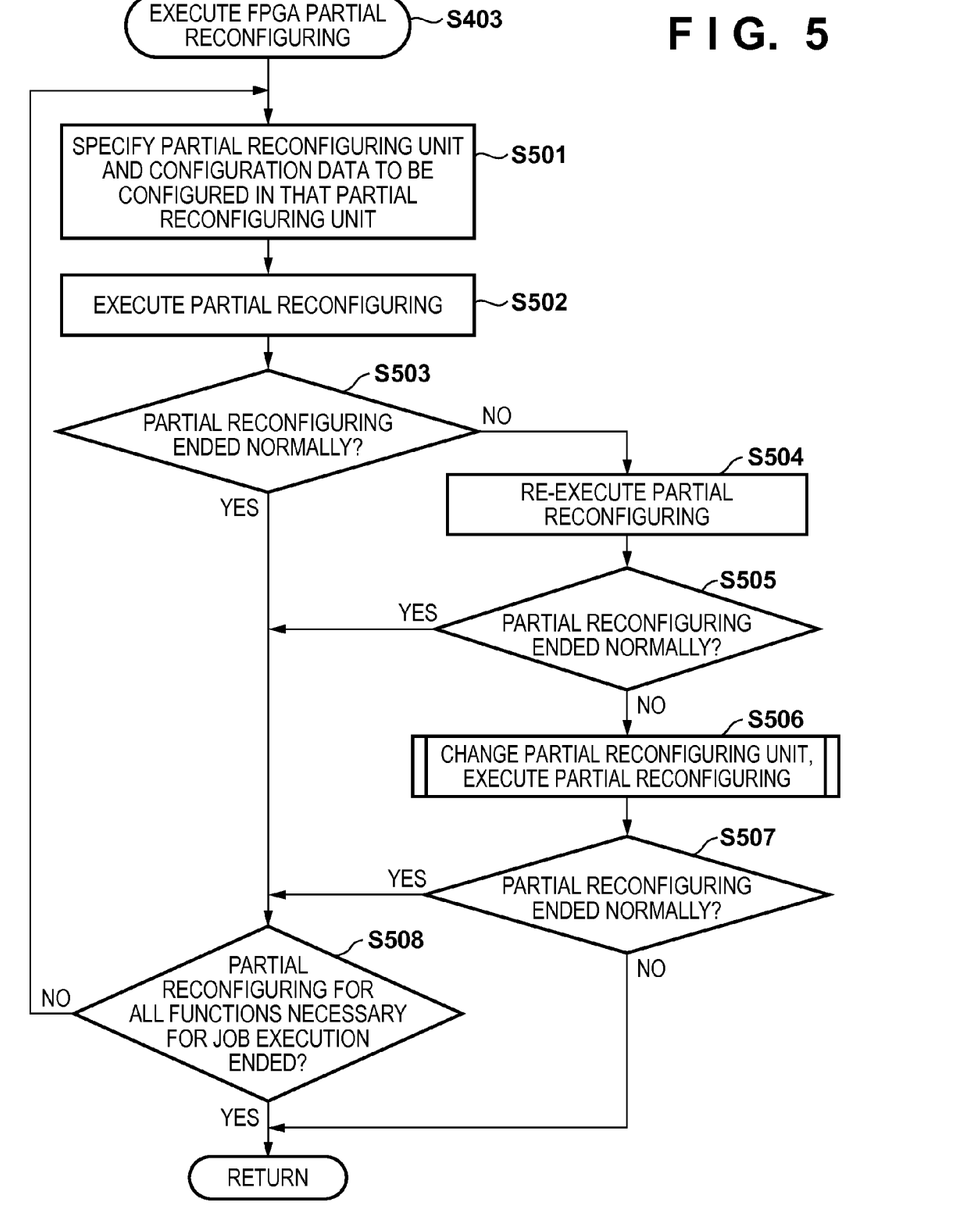
FIG. 5 is a flowchart for describing details of FPGA partial reconfiguring execution processing in step S403 in FIG. 4, which is performed by the image processing apparatus according to the embodiment.

FIG. 5 is a flowchart for describing details of FPGA partial reconfiguring execution processing in step S403 of FIG. 4, which is performed by the image processing apparatus 100 according to the present embodiment. Note that the procedures in the flowchart of FIG. 5 are executed by the CPU 101, or by the configuration controller 130 in accordance with instructions from the CPU 101.

First, in step S501, the CPU 101 specifies a partial reconfiguration unit that is to undergo reconfiguring, and the configuration data that corresponds to the function that is to be configured in the partial reconfiguration unit from among the configuration data stored in the configuration ROM 150. For example, in the case of configuring the function A circuit in the partial reconfiguration unit (PR1) 201, the CPU 101 specifies the configuration data 301 for the PR1 function A from among the configuration data stored in the configuration ROM 150. Here, the CPU 101 specifies a partial reconfiguration unit that is not being used in job processing in the FPGA 140 and can be rewritten, based on information from the reconfiguration management unit 205.

Next, the procedure moves to step S502, in which the CPU 101 instructs the configuration controller 130 to execute partial reconfiguring. Specifically, an instruction is given for the configuration data and the writing-target partial reconfiguration unit that were specified in step S501. Here, for example, an instruction is given to write configuration data to the partial reconfiguration unit (PR1) 201. Then, the procedure moves to step S503, in which the CPU 101 determines whether or not the partial reconfiguring in step S502 ended normally, based on a response from the configuration controller 130. In this determination, the reconfiguration management unit 205 monitors for a signal that is output by the FPGA 140 and indicates that partial reconfiguring ended normally, and it is determined that partial reconfiguring ended normally if the error detection unit 206 does not detect an error. If the CPU 101 determines in step S503 that partial reconfiguring ended normally, the procedure moves to step S508, in which the CPU 101 determines whether partial reconfiguring for all of the functions necessary for executing the job has ended. If partial reconfiguring for all of the functions has ended, this processing is ended, and the procedure moves to step S404 in FIG. 4. On the other hand, if the CPU 101 determines in step S508 that partial reconfiguring for all of the functions necessary for executing the job has not ended, the procedure returns to step S501, and partial reconfiguring for a remaining necessary function is executed.

On the other hand, if the CPU 101 determines in step S503 that partial reconfiguring has not ended normally, the procedure moves to step S504. In step S504, since the partial reconfiguring executed in step S502 failed for some sort of reason, the CPU 101 instructs the configuration controller 130 to re-execute the partial reconfiguring that was performed in step S502. The procedure then moves to step S505, in which, similarly to previously-described step S503, CPU 101 determines whether or not re-execution of the partial reconfiguring executed in step S504 ended normally. If the CPU 101 determines in step S505 that the re-execution of partial reconfiguring ended normally, the procedure moves to step S508, and otherwise the procedure moves to step S506. Note that if it is determined in step S505 that partial reconfiguring did not end normally, the CPU 101 may execute the processing of step S504 and step S505 multiple times.

In step S506, the CPU 101 instructs the configuration controller 130 to switch the partial reconfiguration unit in which the configuration data for executing the function is to be written to a partial reconfiguration unit that is not executing other processing. Furthermore, the CPU 101 gives an instruction to write the corresponding configuration data to the switched partial reconfiguration unit. For example, in the case of failure when attempting to configure the function A circuit in the partial reconfiguration unit (PR1) 201, if the partial reconfiguration unit (PR2) 202 is free, reconfiguring for the function A circuit is carried out in that unit. The processing in step S506 for switching the partial reconfiguration unit and then executing partial reconfiguring will be described in detail later with reference to FIG. 6. The procedure then moves to step S507, in which the CPU 101 determines whether the switching and partial reconfiguring of the partial reconfiguration unit executed in step S506 was successful. This determination is also made by, similarly to step S503 and step S505, the reconfiguration management unit 205 and the error detection unit 206 monitoring for a signal indicating a normal end or an end with error in the FPGA. If the CPU 101 determined in step S507 that partial reconfiguring ended normally, the procedure moves to step S508, and if the partial reconfiguring ended with an error, the partial reconfiguring processing is ended, and the procedure moves to step S404 in FIG. 4.

In this way, if the writing of configuration data to one partial reconfiguration unit of the FPGA fails, configuration data for executing the same function can be written to another partial reconfiguration unit in the FPGA. Accordingly, even if the configuration for one function in one partial reconfiguration unit of the FPGA fails, the same function can be configured in another partial reconfiguration unit.

Next, processing for the switching and partial reconfiguring of a partial reconfiguration unit will be described in detail with reference to FIG. 6.

Figure 6:
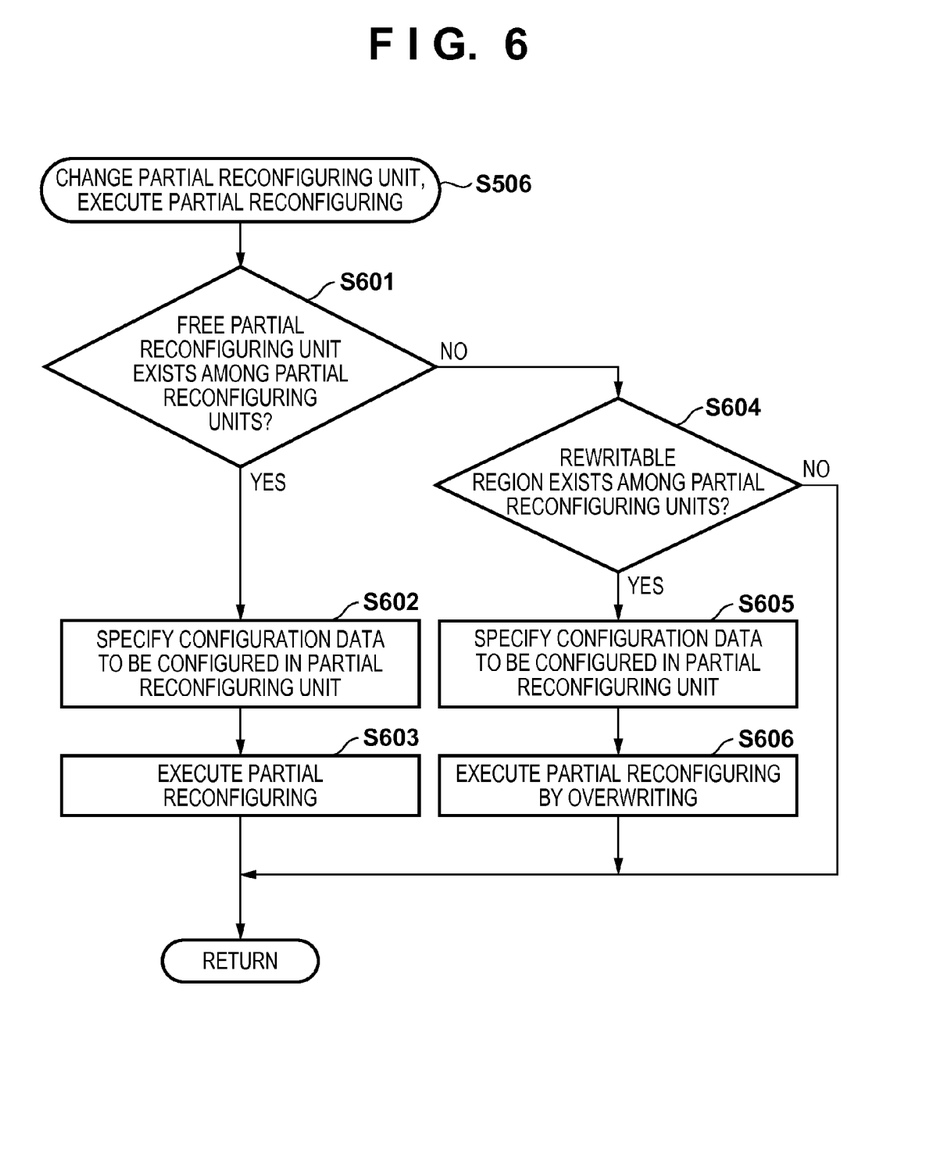
FIG. 6 is a flowchart for describing details of processing in step S506 of FIG. 5, which is performed by the image processing apparatus according to the embodiment.

FIG. 6 is a flowchart for describing details of the processing in step S506 of FIG. 5, which is performed by the image processing apparatus 100 according to the present embodiment. Note that the procedures in the flowchart of FIG. 6 are executed by the CPU 101, or by the configuration controller 130 in accordance with instructions from the CPU 101.

First, in step S601, based on information from the reconfiguration management unit 205, the CPU 101 determines whether or not there is a free partial reconfiguration unit (a partial reconfiguration unit not configured with any circuit configuration, that is to say, a partial reconfiguration unit substantially not operating as a circuit) among the partial reconfiguration units of the FPGA 140. If the CPU 101 determined in step S601 that there is a free partial reconfiguration unit among the partial reconfiguration units of the FPGA 140, the procedure moves to step S602, and if there is no free region, the procedure moves to step S604. In step S602, the CPU 101 specifies configuration data that is to be written to the free partial reconfiguration unit. For example, if the partial reconfiguration unit (PR2) is free, and the function A is to be configured therein, the configuration data 311 for the PR2 function A is specified from the configuration ROM 150. The procedure then moves to step S603, in which the CPU 101 executes partial reconfiguring by writing the configuration data that was specified in step S602 to the free partial reconfiguration unit that was found in step S601, and then ends this processing. Note that it is conceivable to have the case where in step S602, configuration data that corresponds to the free partial reconfiguration unit and is for executing the function is not stored in the configuration ROM 150. In this case, the CPU 101 may search for another free partial reconfiguration unit for which configuration data for executing the function is stored.

On the other hand, in step S604, the CPU 101 determines whether or not there is a rewritable partial reconfiguration unit among the partial reconfiguration units of the FPGA 140, because there was no free partial reconfiguration unit among the partial reconfiguration units of the FPGA 140. Here, a rewritable partial reconfiguration unit is a partial reconfiguration unit that has some sort of configuration data written therein, but is not being used for current processing. If the CPU 101 determines in step S604 that there is a rewritable partial reconfiguration unit among the partial reconfiguration units of the FPGA 140, the procedure moves to step S605, and if there is no rewritable partial reconfiguration unit, this processing is ended, and the procedure moves to step S507 in FIG. 5.

In step S605, because there is a rewritable partial reconfiguration unit among the partial reconfiguration units of the FPGA 140, the CPU 101 specifies configuration data that is to be configured in the rewritable partial reconfiguration unit that was specified in step S604. For example, in the case of configuring the function A in the partial reconfiguration unit (PR3) 203, the configuration data 331 for the PR3 function A is specified from the configuration ROM 150. The procedure then moves to step S606, in which the CPU 101 overwrites the rewritable partial reconfiguration unit that was found in step S604 with the configuration data that was specified in step S605, and then this processing is ended. Note that it is conceivable to have the case where in step S605, the configuration data that corresponds to the rewritable partial reconfiguration unit and is for executing the function is not stored in the configuration ROM 150. In this case, the CPU 101 may search for another rewritable partial reconfiguration unit for which configuration data for executing the function is stored.

Accordingly, if the configuring of one partial reconfiguration unit of the FPGA fails, either a free (unconfigured) partial reconfiguration unit in the FPGA, or a partial reconfiguration unit that is configured but not currently be used is searched for. When such partial reconfiguration unit is found, configuration data that corresponds to that partial reconfiguration unit and corresponds to the function that is to be configured therein can be specified, and the configuring of the FPGA can be executed with that specified configuration data.

Next, processing for executing full reconfiguring in step S405 of FIG. 4 will be described in detail with reference to FIG. 7.

Figure 7:
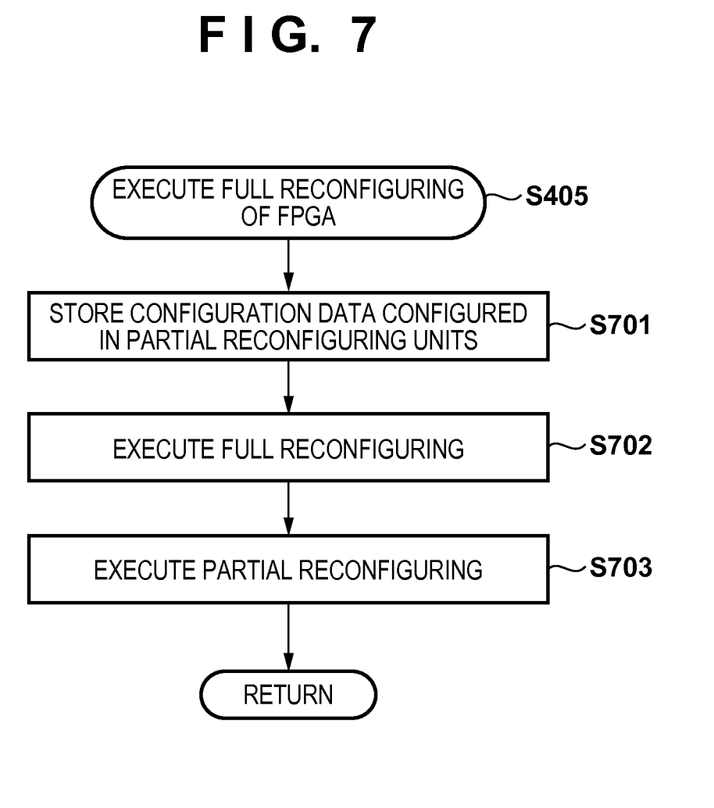
FIG. 7 is a flowchart for describing full reconfiguring processing executed in step S405 of FIG. 4, which is performed by the image processing apparatus according to the embodiment.

FIG. 7 is a flowchart for describing details of full reconfiguring processing executed in step S405 of FIG. 4, which is performed by the image processing apparatus 100 according to the present embodiment. Note that the procedures in the flowchart of FIG. 7 are achieved by the CPU 101, or by the configuration controller 130 in accordance with instructions from the CPU 101.

In step S701, the CPU 101 acquires the types of configuration data that are configured in the partial reconfiguration units of the FPGA 140 from the configuration controller 130, and stores the types in the RAM 111. The types of configuration data configured in the partial reconfiguration units are stored here in order to execute partial reconfiguring after full reconfiguring and set the circuit configuration of the FPGA 140 to the same state as before full reconfiguring. Next, the procedure moves to step S702, in which the CPU 101 executes full reconfiguring of the FPGA 140. Here, the functions A to D of the FPGA 140 are configured in the partial reconfiguration units 201 to 204 of the FPGA 140. For example, the function A is configured in the partial reconfiguration unit 201, the function B is configured in the partial reconfiguration unit 202, the function C is configured in the partial reconfiguration unit 203, and the function D is configured in the partial reconfiguration unit 204. Next, the procedure moves to step S703, in which the CPU 101 executes partial reconfiguring as necessary in order to achieve the same state as before full reconfiguring, which was stored in step S701. Here, for example, the function B is configured in the partial reconfiguration unit 201, and the function A is configured in the partial reconfiguration unit 202. Note that if full reconfiguring of the FPGA 140 in step S702 is executed based on the types of configuration data that were configured in the partial reconfiguration units of the FPGA 140, which were stored in step S701, the processing of step S703 can be omitted.

According to the present embodiment described above, in an image processing apparatus including an FPGA that can undergo dynamic partial reconfiguring, even if a failure occurs in dynamic partial reconfiguring, it is possible to execute recovery control for suppressing performance degradation as much as possible.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129708 filed on Jun. 24, 2014, which is hereby incorporated by reference herein in its entirety.

What is claimed is:

1. An image processing apparatus comprising:
a reconfigurable circuit that includes a first portion and a second portion, in which a circuit configuration is partially performable;
a storage unit that stores first circuit configuration information used for configuring, in the first portion, a first circuit which serves a predetermined function, and second circuit configuration information used for configuring, in the second portion, a second circuit which serves the predetermined function;
a specification unit that specifies a portion of the reconfigurable circuit, in which a circuit which serves the predetermined function is to be configured; and
a configuring unit that performs, if the first portion is specified by the specification unit, a circuit configuration on the first portion using the stored first circuit configuration information, and performs, if the second portion is specified by the specification unit, a circuit configuration on the second portion using the stored second circuit configuration information.

2. The image processing apparatus according to claim 1, wherein the specification unit specifies a free portion from among a plurality of portions included in the reconfigurable circuit.

3. The image processing apparatus according to claim 2, wherein the free portion is a portion substantially not operating as a circuit.

4. A control method that uses a reconfigurable circuit including a first portion and a second portion, in which a circuit configuration is partially performable, the method comprising:
specifying a portion of the reconfigurable circuit in which a circuit serving a predetermined function is to be configured;
performing control for, if the first portion is specified in the specifying, configuring, in the first portion, a circuit which serves the predetermined function using first circuit configuration information; and
performing control for, if the second portion is specified in the specifying, configuring, in the second portion, a circuit which serves the predetermined function using second circuit configuration information.

5. The control method according to claim 4, wherein the specifying is performed by specifying a free portion from among a plurality of portions included in the reconfigurable circuit.

6. The control method according to claim 5, wherein the free portion is a portion substantially not operating as a circuit.

7. An image processing apparatus having a reconfigurable circuit in which a circuit configuration is partially performable, the image processing apparatus comprising:
a storage unit that stores circuit configuration information for configuring the reconfigurable circuit;
a specification unit that specifies a piece of circuit configuration information stored in the storage unit that corresponds to a function necessary for execution of a job;
a reconfiguring unit that executes partially reconfiguring for the function in the reconfigurable circuit by configuring a partial reconfiguration unit of the reconfigurable circuit using the piece of circuit configuration information that was specified by the specification unit; and
a control unit that performs control so as to execute the job using the reconfigurable circuit if reconfiguring by the reconfiguring unit is successful, and cause the reconfiguring unit to re-execute reconfiguring if reconfiguring by the reconfiguring unit fails.

8. The image processing apparatus according to claim 7, wherein the reconfigurable circuit has a plurality of partial reconfiguration units in which a circuit configuration is performable, and
the storage unit stores a plurality of pieces of circuit configuration information corresponding to a plurality of functions, in association with each of the plurality of partial reconfiguration units.

9. The image processing apparatus according to claim 8, wherein the control unit controls the reconfiguring unit so as to, if reconfiguring by the reconfiguring unit fails, configure a partial reconfiguration unit in which a circuit configuration is not configured from among the reconfigurable circuits, using a piece of circuit configuration information that corresponds to the function and corresponds to the partial reconfiguration unit in which a circuit configuration is not configured.

10. The image processing apparatus according to claim 8, wherein the control unit controls the reconfiguring unit so as to, if reconfiguring by the reconfiguring unit fails, configure a partial reconfiguration unit that has a circuit configuration configured therein but is not being used in the job from among the reconfigurable circuits, by performing overwriting with a piece of circuit configuration information that corresponds to the function and corresponds to the partial reconfiguration unit that is not being used.

11. The image processing apparatus according to claim 9, wherein the control unit performs control so as to, if reconfiguring by the reconfiguring unit fails, and a piece of circuit configuration information that corresponds to the function and corresponds to a partial reconfiguration unit in which a circuit configuration is not configured from among the reconfigurable circuits is not stored in the storage unit, cause the reconfiguring unit to re-execute reconfiguring on a partial reconfiguration unit in which a circuit configuration is not configured from among the reconfigurable circuits for which circuit configuration information that corresponds to the function is stored in the storage unit.

12. The image processing apparatus according to claim 10, wherein the control unit performs control so as to, if reconfiguring by the reconfiguring unit fails, and a piece of circuit configuration information that corresponds to the function and corresponds to a partial reconfiguration unit that has a circuit configuration configured therein but is not being used in the job from among the reconfigurable circuits is not stored in the storage unit, cause the reconfiguring unit to re-execute reconfiguring on a partial reconfiguration unit that is not being used for the job and for which circuit configuration information that corresponds to the function is stored in the storage unit.

13. The image processing apparatus according to claim 8, wherein the control unit further has a full reconfiguration unit configured to, if reconfiguring fails when the reconfiguring unit re-executes reconfiguring, configure all of the partial reconfiguration units of the reconfigurable circuits using the circuit configuration information stored in the storage unit.

14. The image processing apparatus according to claim 7, wherein the reconfigurable circuit is an FPGA (Field Programmable Gate Array) in which the plurality of partial reconfiguration units can each be dynamically reconfigured.

15. A control method for controlling an image processing apparatus having a reconfigurable circuit in which a circuit configuration is partially performable, the control method comprising:

specifying a piece of circuit configuration information that is stored in a memory configured to store circuit configuration information for configuring the reconfigurable circuit, and that corresponds to a function necessary for execution of a job;

executing partially reconfiguring for the function in the reconfigurable circuit by configuring a partial reconfiguration unit of the reconfigurable circuit using the piece of circuit configuration information that was specified in the specifying step; and performing control so as to execute the job using the reconfigurable circuit if reconfiguring in the reconfiguring step is successful, and cause reconfiguring in the reconfiguring step to be re-executed if reconfiguring in the reconfiguring step fails.

* * * * *